United States Patent
Everhart et al.

(10) Patent No.: US 6,240,347 B1
(45) Date of Patent: May 29, 2001

(54) VEHICLE ACCESSORY CONTROL WITH INTEGRATED VOICE AND MANUAL ACTIVATION

(75) Inventors: Charles Allen Everhart, Ypsilanti; Florian Frischmuth, Dearborn; Gary John Rushton, Warren, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/175,782

(22) Filed: Oct. 13, 1998

(51) Int. Cl.[7] ............... G06F 7/00; G05D 1/00; G10K 11/00; G10L 11/00
(52) U.S. Cl. ............... 701/36; 701/1; 701/49; 367/197; 367/198; 704/275
(58) Field of Search .................. 701/49, 36, 1; 340/825.19; 381/110, 86; 367/197, 198; 704/275, 271

(56) References Cited

U.S. PATENT DOCUMENTS

| | | | |
|---|---|---|---|
| 4,401,852 | 8/1983 | Noso et al. | 367/198 |
| 4,455,454 | 6/1984 | Umebayashi | 455/556 |
| 4,501,012 | 2/1985 | Kishi et al. | 704/275 |
| 4,503,528 | 3/1985 | Nojiri et al. | 367/198 |
| 4,528,687 | 7/1985 | Noso et al. | 704/275 |
| 4,637,045 | 1/1987 | Noso et al. | 704/275 |
| 4,776,016 | * 10/1988 | Hansen | 381/42 |
| 4,792,783 | 12/1988 | Burgess et al. | 307/10.1 |
| 4,827,520 | 5/1989 | Zeinstra | 701/1 |
| 5,020,107 | 5/1991 | Rohani et al. | 704/275 |
| 5,172,321 | 12/1992 | Ghaem et al. | 455/456 |
| 5,177,685 | 1/1993 | Davis et al. | 455/456 |
| 5,214,707 | 5/1993 | Fujimoto et al. | 704/275 |
| 5,239,700 | 8/1993 | Guenther et al. | 455/158.4 |
| 5,450,525 | 9/1995 | Russell et al. | 704/275 |
| 5,544,061 | 8/1996 | Morimoto et al. | 701/202 |
| 5,602,963 | 2/1997 | Bissonnette et al. | 704/275 |
| 5,664,061 | 9/1997 | Andreshak et al. | 704/275 |
| 5,847,704 | * 12/1998 | Hartman | 345/339 |
| 5,878,395 | * 3/1999 | Bennett | 704/275 |
| 5,916,288 | * 6/1999 | Hartman | 701/36 |
| 6,049,288 | * 4/2000 | Kawasaki | 340/815.4 |

OTHER PUBLICATIONS

"Vox Pupli, Someone could make a fortune by inventing a good universal remote for accessory controls", Paul Van Valkenburgh, Automotive Industries, Nov., 1993, pp. 51–52.
"Auto 2010", Paul Van Valkenburgh, 1991, pp. 88–89.
Speech Recognition And In–Vehicle Interfaces Prototype For Intelligent Vehicle–Highway Systems, Mary T. Mock, The MITRE Corporation, pp. 650–655.
Vehicle Navigation & Information Systems Conference Proceedings, P–253, Part 2, Human Factors Engineering the TravTek Driver Interface, Dingus, et al., pp. 749–755.
"Vox Populi", Paul Van Valkenburgh, Automotive Industries, Nov., 1993, pp. 51–52.*

* cited by examiner

*Primary Examiner*—Jacques H. Louis-Jacques
*Assistant Examiner*—Brian J. Broadhead
(74) *Attorney, Agent, or Firm*—Mark L. Mollon (57) ABSTRACT

A voice activated control system responsive to spoken voice commands is integrated with an advanced central display/control unit having dedicated and reconfigurable push buttons to control individual vehicle accessories in a complementary fashion as well as in standalone modes. The two controllers share additional input and output resources including reconfigurable steering wheel switches and a heads-up display showing the current configuration of the steering wheel switches. Thus, a driver can control a plurality of adjustable parameters of a plurality of vehicle accessories with a convenient and easy to use interface which makes efficient use of hardware and reduces costs.

7 Claims, 8 Drawing Sheets

VEHICLE ACCESSORY CONTROL WITH INTEGRATED VOICE AND MANUAL ACTIVATION

BACKGROUND OF THE INVENTION

The present invention relates in general to controlling electrical accessories in an automotive vehicle, and more specifically, to a voice activated control system integrated with manual control elements and associated displays to provide a simple and efficient user interface.

Recent advances in electronics have made more and more accessory functions available for controllable use in mobile vehicles, such as navigation aids, audio entertainment using various types of recorded media, precise climate control, and remote control of many vehicle components and systems. To help insure that a driver can take advantage of this proliferation of features and controls without interfering with the task of driving a vehicle, a simple and efficient driver-machine interface (DMI) is desired. For example, a desire to maintain the driver's hands on the steering wheel and eyes on the road has led to an interest in voice recognition technologies. These systems initiate control actions based on spoken commands being recognized using advanced computation techniques.

Voice activation systems require the user to learn a predetermined grammar (i.e., a set of spoken commands) which can be recognized. As the number of systems and functions controlled by speech control increases, the user is required to learn an ever larger grammar. To simplify the voice recognition task and minimize the required grammar, it has been suggested to provide manual control switches on a steering wheel which may be reconfigured using voice commands. However, system cost and complexity are driven up as more features and components are added to the voice actuation system itself. Furthermore, control operations can still remain complex and difficult to use and remember without an appropriate interface.

SUMMARY OF THE INVENTION

The present invention has the advantages of providing a convenient and easy to use interface while minimizing system components by sharing resources between separate control devices. The integrated system simultaneously achieves simple operation while maintaining flexibility to implement a large number of diverse control functions.

In one aspect of the invention, an apparatus is provided in an automotive vehicle wherein the vehicle has a passenger cabin with a steering wheel, an instrument panel, and a front window. A controllable accessory has a plurality of controllable function parameters. A speech processor is coupled to the controllable accessory for recognizing spoken sounds and transmitting corresponding commands to the controllable accessory. A central display/control unit is coupled to the controllable accessory and includes a visual display containing current values of the controllable function parameters, and includes a plurality of control elements for manually selecting desired changes in the current values. The central display/control unit transmits commands corresponding to the desired changes to the controllable accessory. Reconfigurable control elements are coupled to the speech processor and to the central display/control unit, and are mounted on the steering wheel for adjusting current values of the controllable function parameters. The reconfigurable control elements can be reconfigured to a selected parameter by either the speech processor or the central display/control unit. A heads-up display is coupled to the speech processor and the central display/control unit for displaying at least one indicator above the instrument panel corresponding to the selected parameter to identify a current configuration of the reconfigurable control elements.

DETAILED DESCRIPTION OF PREFERRED EMBODIMENTS

The present invention provides convenient and easy to use control of vehicle electronics accessories such as navigation systems, audio systems, climate control systems, audio and video disc players, power windows and mirrors, door locks, clocks, interior and exterior lights, information gauges and displays, and powered position setting of seats, steering wheels, and floor pedals, for example. In view of the large number of systems that must be controlled, and the numerous function parameters of each system that can be adjusted, the driver-machine interface (DMI), or the way in which the driver interacts with the various controls, becomes of paramount importance. The present invention makes extensive use of voice activated controls together with an advanced central display/control unit wherein the individual control systems function in a complementary fashion and are also capable of operating in standalone modes. In addition, the two separate controllers share certain input and output resources which provides easier operator control and reduces costs. In addition, the central display/control unit may itself be integrated with one or more accessories such as a navigation system or an audio system.

Figure 1:
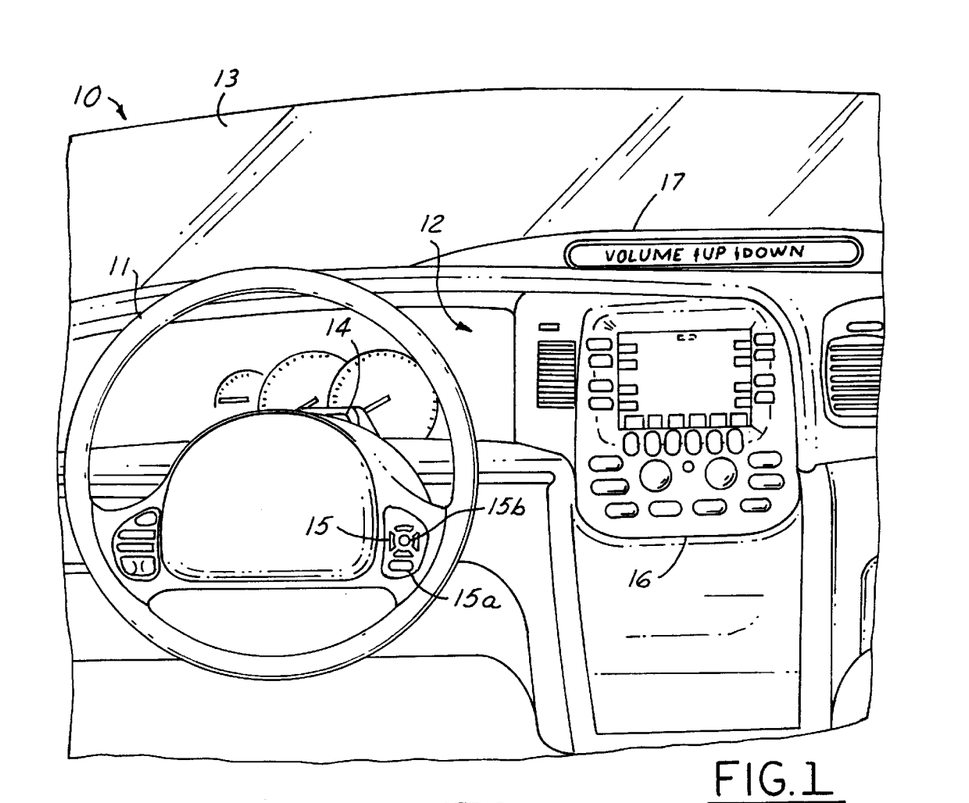
FIG. 1 is an interior view of a vehicle passenger cabin including the control system of the present invention.
Figure 2:
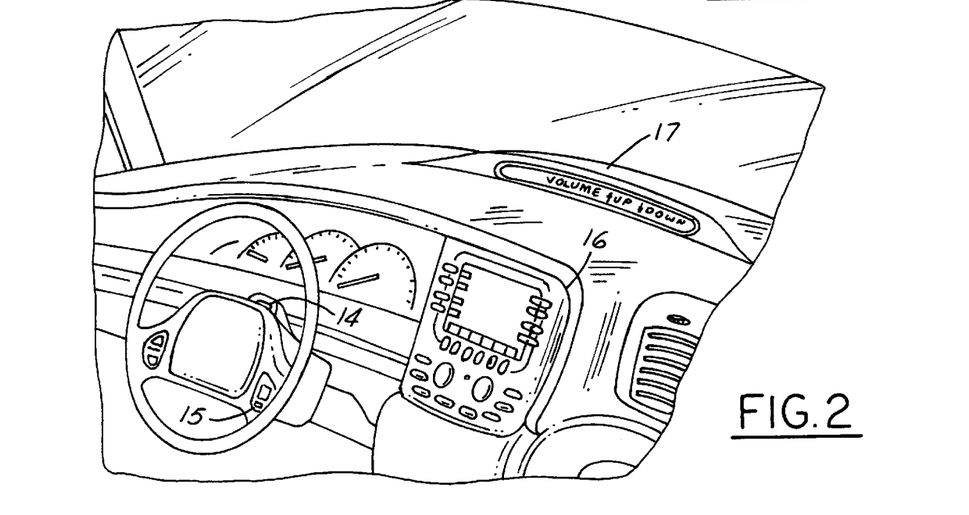
FIG. 2 is a perspective view of the same area shown in FIG. 1 illustrating the location of a heads-up display.

Referring now to FIG. 1, an automotive vehicle includes a passenger cabin 10 with a steering wheel 11, an instrument panel or dashboard 12, and a front window 13. A microphone 14 and a control pad of reconfigurable control elements 15 are mounted on steering wheel 11. A central display/control unit 16 is mounted to the front of instrument panel 12. A heads-up display in the form of an eyebrow-shaped display 17 is mounted proximate to an interface between instrument panel 12 and front window 13. Eyebrow display 17 is used to show the driver what particular functional parameter may be adjusted using the configurable control elements 15 at any particular time. As is more apparent from FIG. 2, the driver can easily refer to eyebrow display 17 to discern the current function assignments for the reconfigurable control elements without taking attention away from the road.

Figure 3:
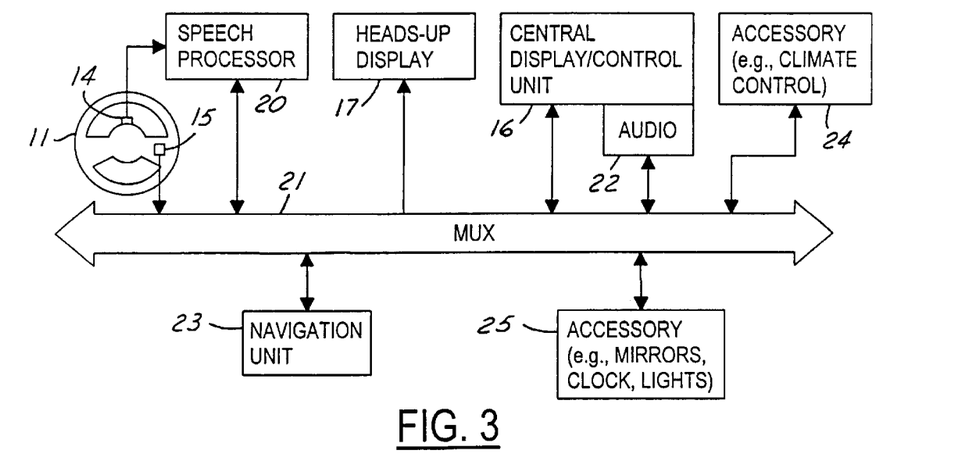
FIG. 3 is a block diagram showing the control system of the present invention.

Referring now to FIG. 3, one embodiment of a system architecture utilizing the present invention will be described. A speech processor 20 receives voice signals from microphone 14 and employs voice recognition techniques to recognize spoken sounds and to transmit corresponding commands to controllable accessories via a multiplex network 21. Besides being commands for adjusting controllable function parameters of controllable accessories, the commands transmitted by speech processor 20 may include synthesized voice messages sent to audio system 22 for reproduction (e.g., in order to provide audible feedback about the functions being controlled or the states of the controls).

Speech processor 20 is preferably comprised of a microcomputer including a main processor, an audio processor, multiplex interfaces, operating system software, and application software. The audio processor digitizes spoken sounds from microphone 14. The voice application software analyzes the digitized speech to determine a matching voice command. Reconfigurable control elements 15 include a dedicated push-to-talk button 15a used to initiate a listening period within speech processor 20.

Reconfigurable control elements 15 include up, down, left, and right push buttons surrounding an enter button 15b. The up, down, left, and right buttons are reconfigurable for performing various parameter adjustments. The control elements are coupled to multiplex network 21 so that switch activation signals are sent to speech processor 20 and/or central display/control unit 16.

Heads-up display 17 in the form of an eyebrow-shaped display provides a multi-character readout in a convenient viewing location in front of the peripheral band at the bottom of the front windshield. For example, a 28-character, 7×9 LED dot matrix display may be used with four characters for displaying time of day and 24 characters for displaying the configuration of the four way reconfigurable steering wheel control elements. In addition, the display may provide confirmation of voice command recognition or non-recognition, as well as notification when the voice system is in the listening mode. Speech processor 20 preferably has a set-up mode wherein these additional uses of display 17 may be enabled or disabled, or otherwise customized. The central display/control unit 16 can also be used to control these customization features.

Central display/control unit 16 controls all the same function parameters that are controllable through speech processor 20, and may include additional function parameters for other accessories in addition to those controlled through speech processor 20. Unit 16 includes an advanced color display such as a thin film transistor active-matrix liquid crystal display. A plurality of multi-function buttons surround the display and may be reconfigured to control various parameters as identified by appropriate labels selectably displayed adjacent to each button. These multi-function buttons are referred to as "soft-keys" which perform a different function depending upon the current state of the system. In addition, a plurality of dedicated buttons (i.e., not reconfigurable) are included in unit 16 located below the soft-keys for controlling frequently used functions. In addition, unit 16 utilizes reconfigurable control elements 15 and heads-up display 17 as additional resources for interfacing with the operator.

One of the accessories that may be controlled in the present invention is a navigation unit 23 which is coupled to the control system through a multiplexed system 21. Thus, the voice recognition grammar utilized by speech processor 20 includes commands executable by navigation unit 23. Likewise, central display/control unit 16 includes menu states for controlling navigation unit 23, for receiving user navigation inputs, and for displaying navigation maps, directions, and information. Navigation functional parameters controllable via speech processor 20 include accessing various navigation menus, map guidance and destination entry, display commands for zooming in and zooming out, requesting repeat of voice instructions, navigation system set-up, and others. Many different types of grammar structures are known in the art which may be used, such as the Hark recognizer.

Central display/control 16 includes menu states corresponding to navigation unit 23 and its controllable parameters. These include menus for destination input, route selection, and navigation interface controls. Each menu includes a particular state of unit 16 in which the soft-keys and their adjacent labels are appropriately configured. Each menu state may also reconfigure the reconfigurable steering wheel control elements and update the eyebrow display on heads-up display 17.

Additional electrical accessories can be controlled, such as accessory 24 (which may be a climate control) and accessory 25 (which may be exterior mirrors, clock, or interior and exterior lights), for example. Central display/control unit 16 includes menu states corresponding to each accessory to permit adjustment of all controllable function parameters associated with each available accessory.

To increase the ease of control system operation and to help minimize system hardware costs, reconfigurable control elements 15 and heads-up display 17 are a shared resource between speech processor 20 and central display/control unit 16. Thus, according to the present invention, whichever controller is currently being used to perform an adjustment obtains active control over reconfigurable control elements 15 and heads-up display 17.

Figure 4:
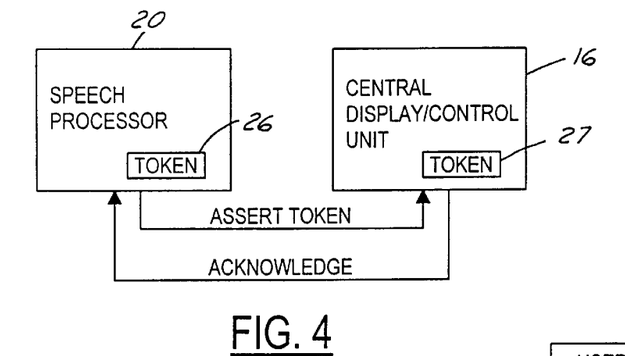
FIG. 4 is a block diagram showing the sharing of a token between separate controllers as used in the present invention.

As shown in FIG. 4, active control is determined according to a token passed between speech processor 20 and central display/control unit 16. Thus, speech processor 20 has a token 26 which operates as a flag (e.g., taking a value of zero or one) for identifying whether speech processor 20 possesses the token at any particular time. Likewise, unit 16 includes a token 27 which has an opposite value from token 26. As shown in FIG. 4, when speech processor 20 is active following a press on the push-to-talk button 15a, token 26 is set to an active value and an "assert token" message is sent to central display/control unit 16 which sets its token 27 to an inactive value. Preferably, unit 16 sends an acknowledgment message to speech processor 20 after setting the token value to an inactive value. Similarly, when unit 16 is being used to adjust a parameter, it sends its own assert token message to speech processor 20 and the token values are set accordingly.

Figure 5:
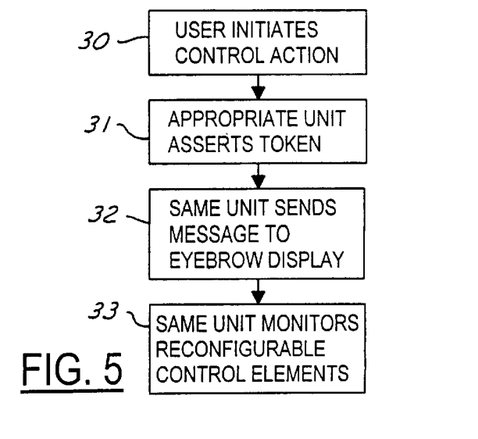
FIG. 5 is a flowchart showing how the token is used.

FIG. 5 shows the method of operation in further detail. In step 30, a user initiates a control action either by pressing the push-to-talk button and uttering a spoken command, or by activating either a soft-key or a dedicated button on central display/control unit 16. Initiation of a control action using speech processor 20 may include a temperature adjustment by speaking the command "temperature". The activated unit asserts the token in step 31. In step 32, the same unit sends a message to the eyebrow display to configure the display to show the current configuration of reconfigurable control elements 15. When the reconfigurable control elements are manually activated, a multiplex message is generated which is received and acted upon by the unit asserting the token in step 33. Examples of just a few of the possible spoken commands and/or central display/control unit key presses together with the resulting configuration of reconfigurable control elements 15 and the actual display contents of heads-up display 17 are shown in the following table.

TABLE

| VOICE COMMAND OR CENTRAL CONTROL PUSH BUTTON ACTIVATED | LEFT/RIGHT SWITCH ASSIGN- MENTS | UP/DOWN SWITCH ASSIGN- MENTS | EYEBROW DISPLAY CONTENTS | |
|---|---|---|---|---|
| Audio Volume | Lower/Raise Volume | Raise/Lower Volume | Volume | ↑Up ↓Down |
| Bass | Lower/Raise Bass | Raise/Lower Bass | Base | ↑Up ↓Down |
| Tune | Tune Down/Up | Tune Up/Down | Tune | ↑Up ↓Down |
| Seek | Seek Down/Up | Seek Up/Down | Seek | ↑Up ↓Down |
| Disc Track | Prev/ Next Track | Next/ Prev Track | Track | ↑Up ↓Down |
| Temperature | Lower/ Raise Temp | Raise/ Lower Temp | Temp. | ↑Up ↓Down |
| Fan | Lower/ Raise Speed | Raise/ Lower Speed | Fan | ↑Up ↓Down |
| Clock Set | Hour Down/Up | Minute Up/Down | Hour Minute | ←Down →Up ↑Up ↓Down |
| Navigation | Scroll Menu | Scroll Menu | Menu Select ←→↑↓ | |

Figure 6:
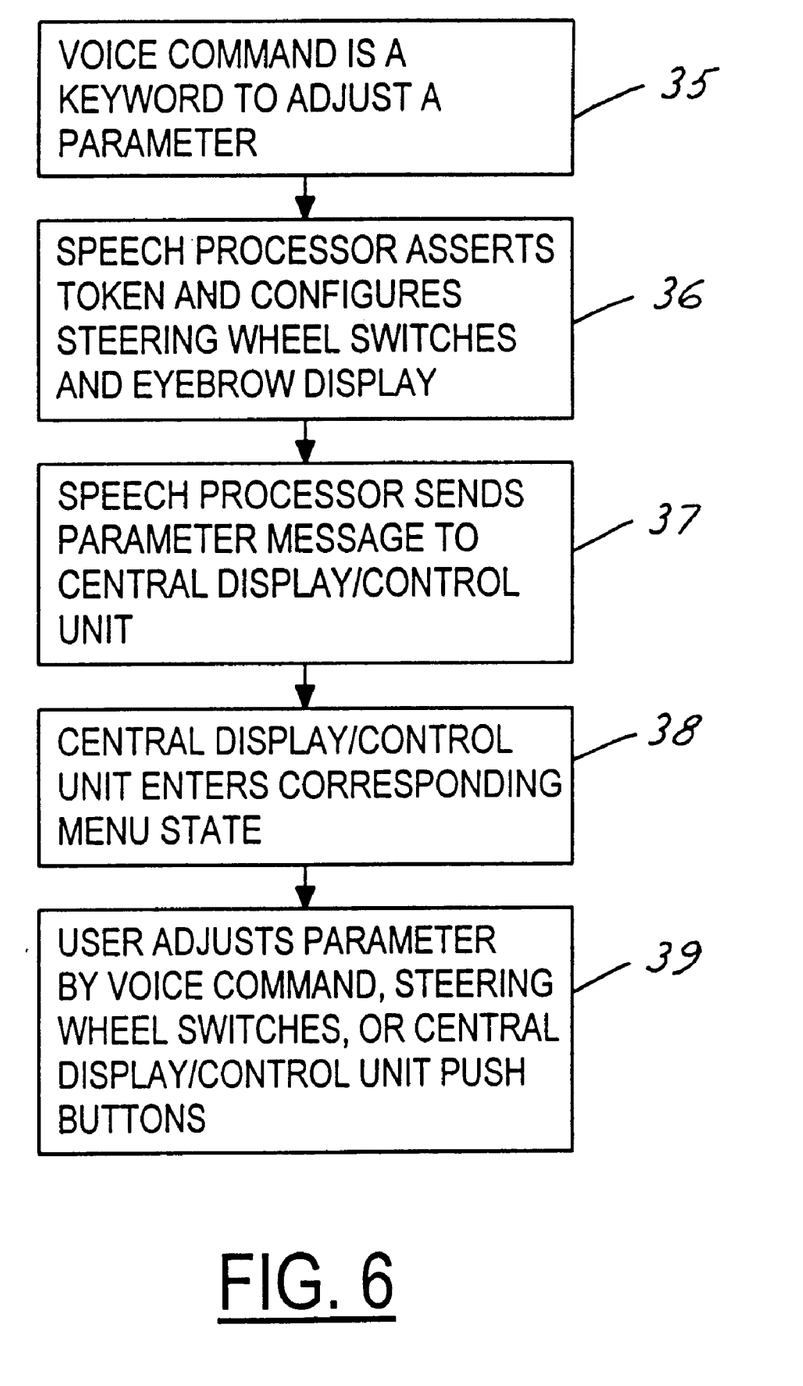
FIG. 6 is a flowchart showing the coordinated operation of a speech processor and a central display/control unit according to the present invention.

Voice commands processed by speech processor 20 may include key words which identify a parameter for adjustment, such as temperature, volume, speed, radio tuning, disc track change, power window position, and many others. Thus, speech processor 20 acts in a key-word driven fashion wherein access to specific functions of different accessories can be directly accessed using a key word, as opposed to the menu driven method used by central display/control unit 16. In other words, several menu states may need to be progressed through in order to access a particular accessory adjustable parameter using central display/control unit 16. In order to provide coordinated operation of speech processor 20 and central display/control unit 16, a further improved method of the present invention is shown in FIG. 6. In step 35, a voice command is issued which is a key word to adjust a parameter of a controlled accessory. The speech processor asserts the token in step 36 and configures the reconfigurable steering wheel switches and the heads-up eyebrow display to correspond to the adjusted parameter. In step 37, the speech processor sends a "parameter message" to the central display/control unit to identify which parameter of the controlled accessory is being adjusted. In step 38, the central display/control unit displays a menu state corresponding to manual adjustment of that parameter. Thus, any intervening menu states are skipped and the user can switch from voice command to manual control using the push buttons of the central display/control unit for any further adjustment of the parameter in step 39. Furthermore, the parameter may be adjusted using the reconfigurable steering wheel switches. Therefore, once a parameter begins to be adjusted, further adjustments or fine tuning can be accomplished using any of the control inputs available. Thus, the driver's attention does not have to stay tied to any single control point.

FIGS. 7–11 show the variable display contents of display 40 contained in central display/control unit 16. Display panel 40 is surrounded by soft keys 41 which may be used to control function parameters identified by labels displayed adjacent to soft-keys 41 by display 40.

Figure 7:
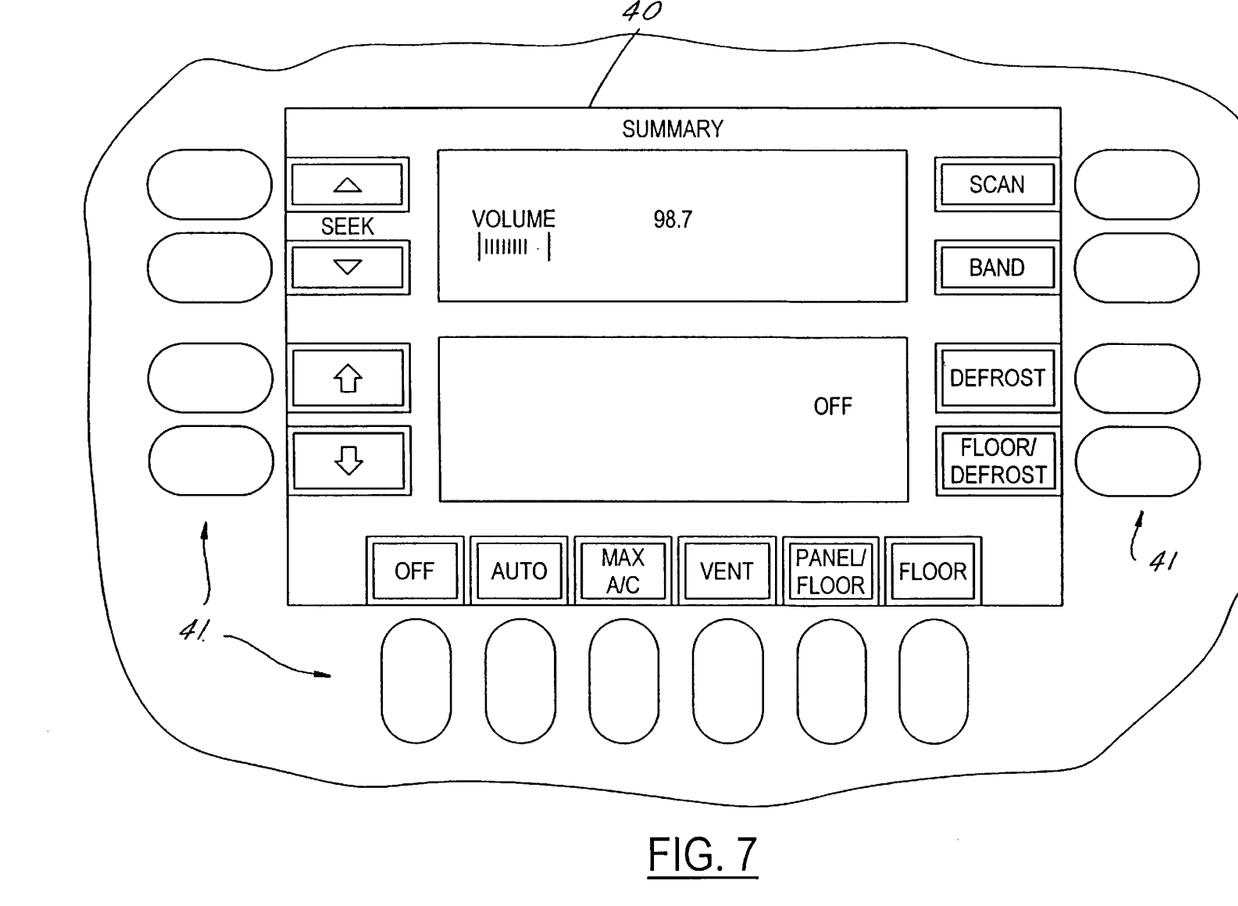
FIGS. 7–11 are front plan views showing the display area of the central display/control unit for various menu states of the control unit for controlling the various accessories.

FIG. 7 shows a summary screen which may be a default screen showing the most frequently adjusted parameters for accessories installed in a vehicle, such as radio reception frequencies, climate control temperature, and blower position. Preferably, a default configuration of the steering wheel reconfigurable control elements is to control radio volume and the volume level is displayed on display 40 at least during volume adjustment.

Figure 8:
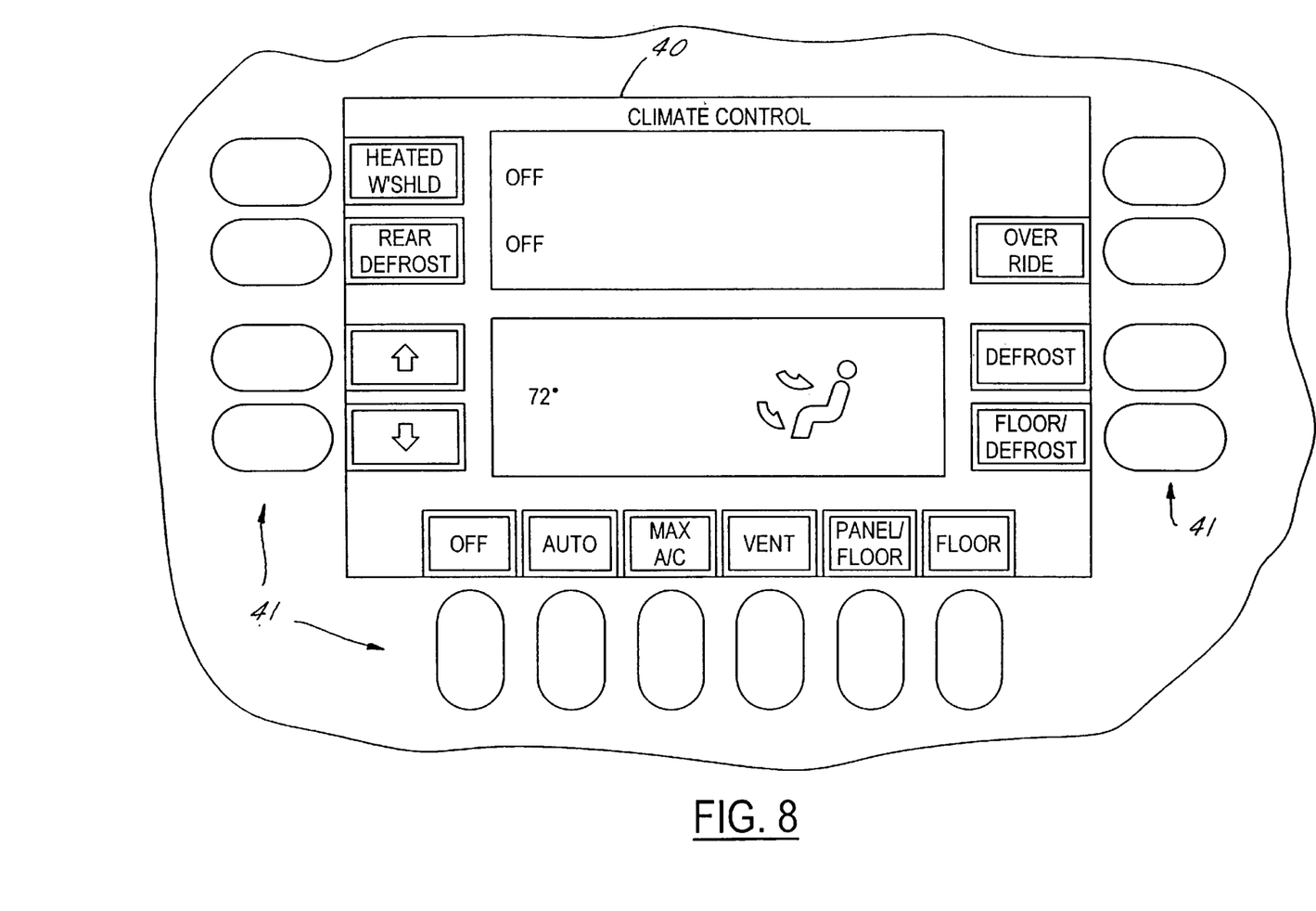

FIG. 8 shows a different menu state dedicated to the climate control and including additional adjustable parameters not available at the summary screen.

Figure 9:
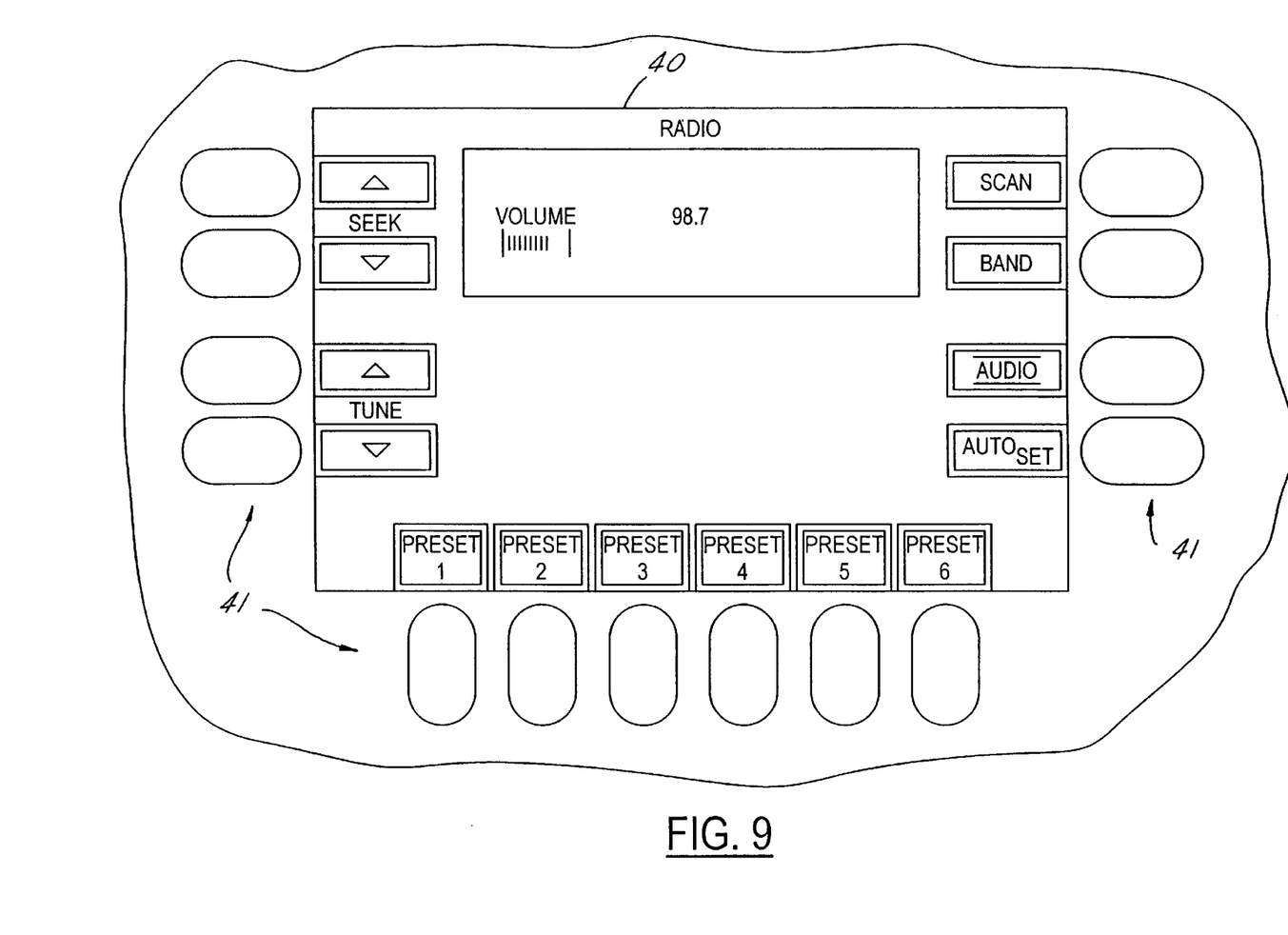

FIG. 9 shows a menu state corresponding to radio controls for the audio system accessory.

Figure 10:
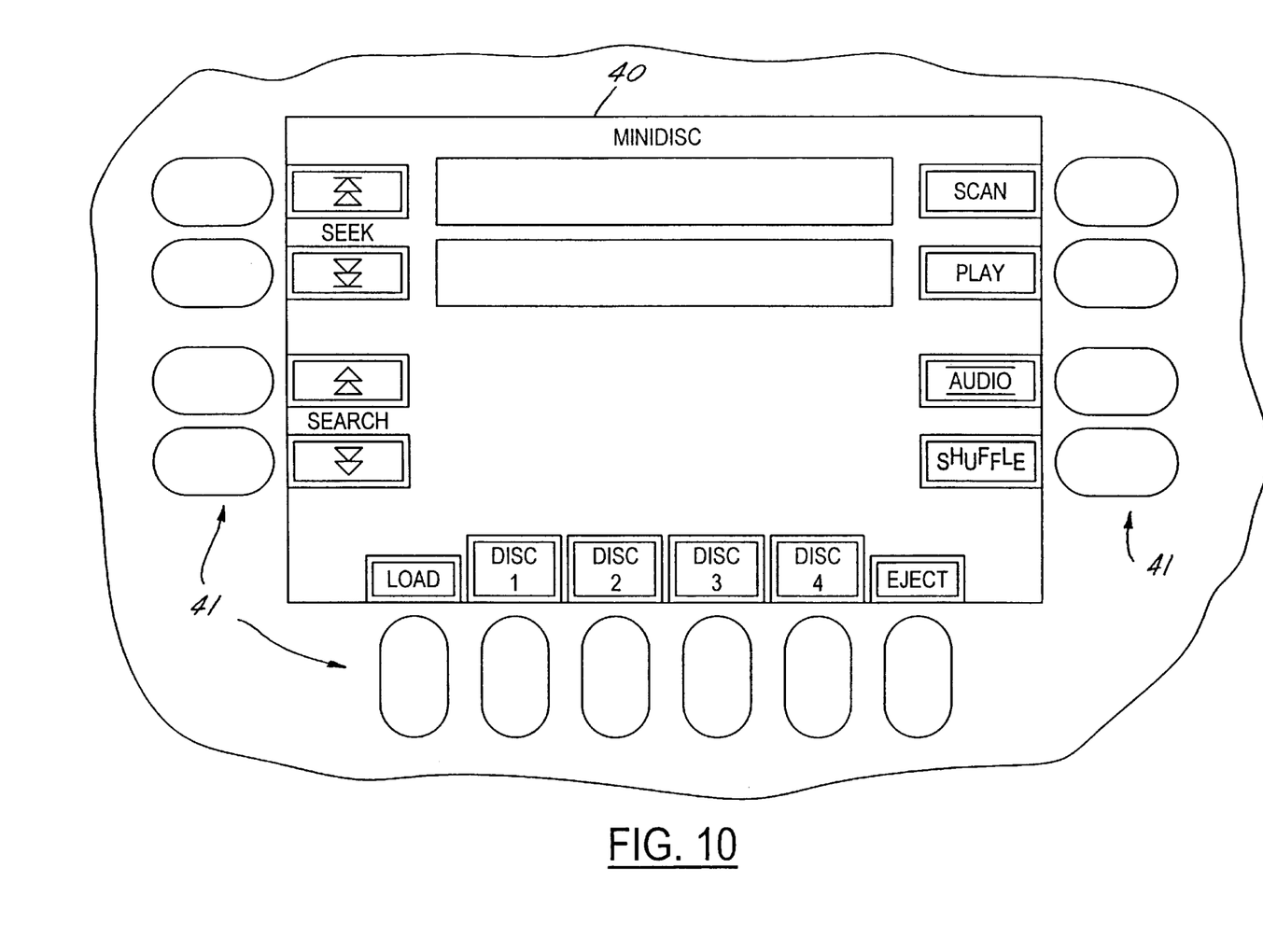

FIG. 10 shows a separate menu state and screen display for controlling an audio system prerecorded media such as a mini-disc.

Figure 11:
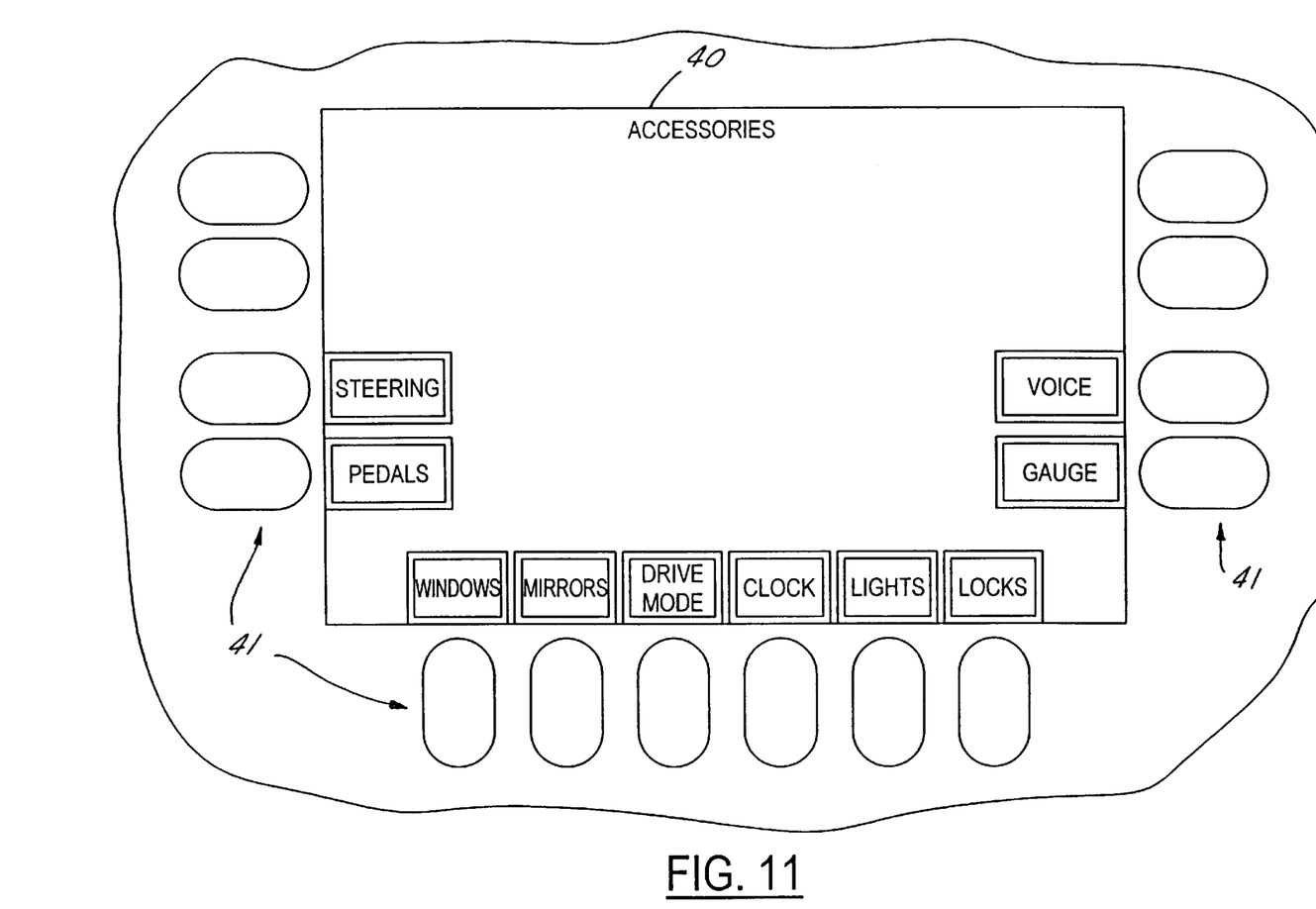

FIG. 11 shows yet another menu state for controlling miscellaneous accessories, some of which may have further menu states and associated displays when they are accessed via a soft-key press. Other menu states such as the climate control and radio tuning may be accessed by presses of dedicated buttons on central display/control unit 16.

What is claimed is:

1. Apparatus in a automotive vehicle wherein said vehicle has a passenger cabin with a steering wheel, an instrument panel, and a front window, said apparatus for controlling a controllable accessory having a plurality of controllable function parameters, said apparatus comprising:

a speech processor coupled to said controllable accessory, said speech processor recognizing spoken sounds and transmitting corresponding commands to said controllable accessory;

a central display/control unit coupled to said controllable accessory, said central display/control unit including a visual display displaying current values of said controllable function parameters and including a plurality of control elements for manually selecting desired changes in said current values, said central display/control unit transmitting commands corresponding to said desired changes to said controllable accessory;

reconfigurable control elements coupled to said speech processor and said central display/control unit and mounted on said steering wheel for adjusting current values of said controllable function paramcters, wherein said reconfigurable control elements can be reconfigured to a selected parameter by either said speech processor or said central display/control unit; and a heads-up display coupled to said speech processor and said central display/control unit displaying at least one indicator above said instrument panel, said indicator corresponding to said selected parameter to identify a current configuration of said reconfigurable control elements;

wherein said speech processor and said central display/control unit pass a token between them which identifies which one of said speech processor or said central display/control unit can interact with said reconfigurable control elements and said heads-up display at any particular time.

2. The apparatus of claim 1 wherein said heads-up display is comprised of an eyebrow display mounted proximate to an interface between said instrument panel and said front window.

3. The apparatus of claim 1 wherein said controllable accessory, said speech processor, said central display/control unit, said reconfigurable control elements, and said heads-up display are interconnected by a multiplex network.

4. The apparatus of claim 1 wherein said reconfigurable control elements are comprised of up, down, left, and right push buttons, and wherein said heads-up display shows indicators specifying respective adjustment actions for changing said current values of said controllable function parameters that will result upon activation of said push buttons in a current configuration.

5. The apparatus of claim 4 wherein said indicators shown by said heads-up display are configured by the one of said speech processor and said central display/control unit identified by said token.

6. A method of controlling an automotive accessory in a vehicle having a passenger cabin with a steering wheel and an instrument panel, wherein said controllable accessory has a plurality of controllable function parameters, and wherein said method utilizes a speech processor, a central display/control unit, reconfigurable control elements, and a heads-up display, said speech processor being coupled to said controllable accessory and recognizing spoken sounds and transmitting corresponding commands to said controllable accessory, said central display/control unit being coupled to said controllable accessory and including a visual display displaying current values of said controllable function parameters and a plurality of control elements for manually selecting desired changes in said current values, said central display/control unit transmitting commands corresponding to said desired changes to said controllable accessory, said reconfigurable control elements being coupled to said speech processor and said central display/control unit and mounted on said steering wheel for adjusting current values of said controllable function parameters, said reconfigurable control elements being reconfigurable to a selected parameter by either said speech processor or said central display/control unit, said heads-up display being coupled to said speech processor and said central display/control unit for displaying at least one indicator above said instrument panel, said indicator corresponding to said selected parameter to identify a current configuration of said reconfigurable control elements, said method comprising:

commanding an adjustment action using a selected one of said speech processor or said central display/control unit;

said selected one of said speech processor or said central display/control unit transmitting an assert token message to the other one of said speech processor or said central display/control unit;

said selected one of said speech processor or said central display/control unit transmitting a display message to said heads-up display in response to said commanded adjustment action to identify a configuration of said reconfigurable control elements; and said selected one of said speech processor or said central display/control unit monitoring said reconfigurable control elements for further adjustment commands while said other one of said speech processor or said central display/control unit ignores said reconfigurable control elements.

7. The method of claim 6 further comprising:

identifying said controllable function parameter using said speech processor;

transmitting an assert token message from said speech processor to said central display/control unit;

transmitting a display message from said speech processor to said heads-up display in response to said identified controllable function parameter;

altering a menu state of said central display/control unit to match said identified controllable function parameter; and accepting adjustment commands for said controllable function parameter from any of said speech processor, said reconfigurable control elements, or said central display/control unit.

* * * * *